UNITED STATES PATENT OFFICE.

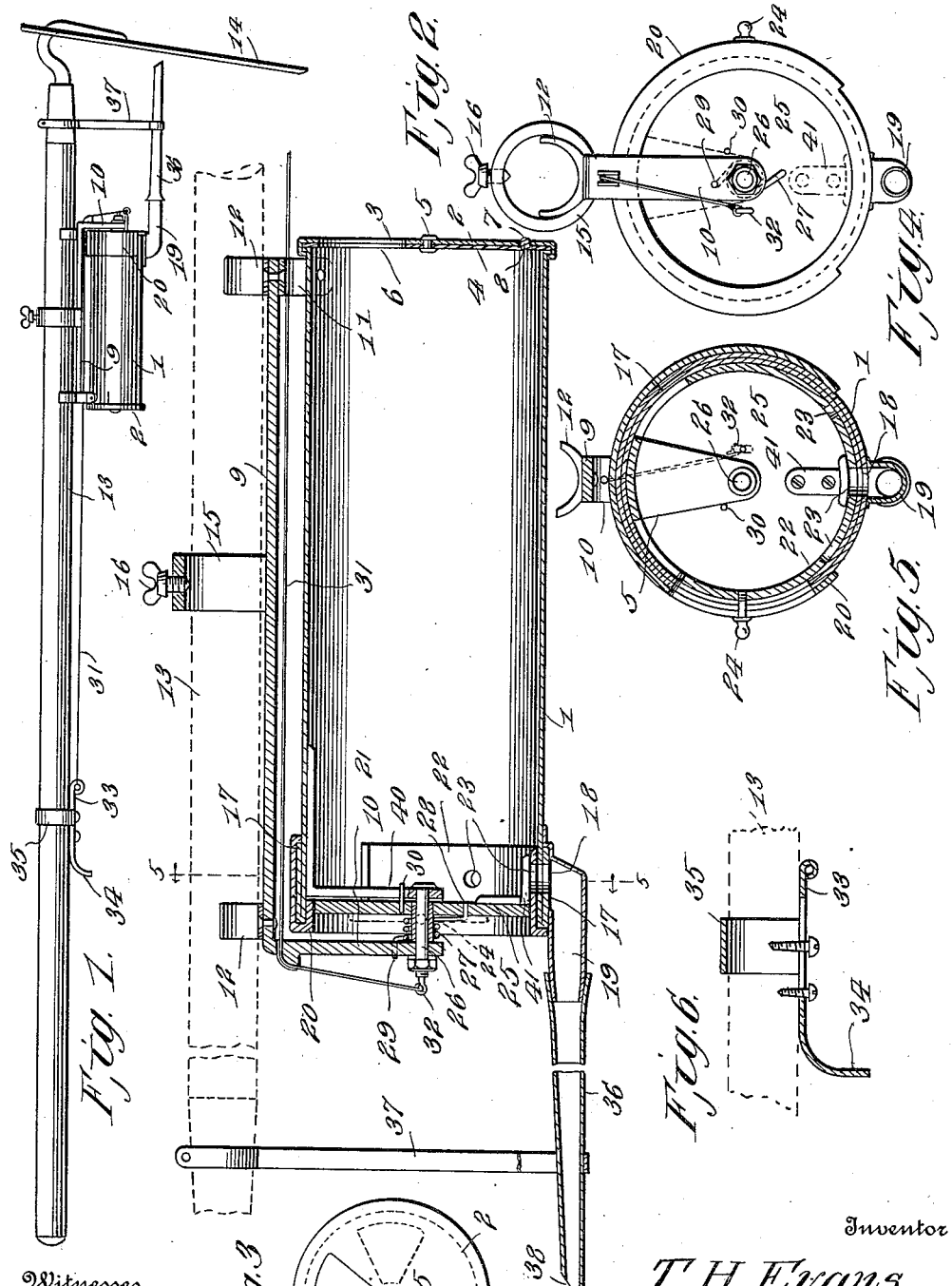

THOMAS H. EVANS, OF LITTLE ROCK, ARKANSAS.

SEED-PLANTER.

1,071,408.  Specification of Letters Patent.  Patented Aug. 26, 1913.

Application filed January 14, 1913. Serial No. 742,032.

*To all whom it may concern:*

Be it known that I, THOMAS H. EVANS, a citizen of the United States, residing at Little Rock, in the county of Pulaski and State of Arkansas, have invented new and useful Improvements in Seed-Planters, of which the following is a specification.

This invention relates to seed planters, and it has for its object to produce a simple and improved planting device which may be readily attached to and used in connection with an ordinary hoe for the purpose of planting or replanting seed of various kinds.

A further object of the invention is to produce a simple and efficient seed planting attachment which may be readily applied to and used in connection with a hoe without interfering with the ordinary use of the hoe.

A still further object of the invention is to produce a simple and efficient seed planting attachment for hoes which may be readily actuated by means of a trigger device so as to deposit seed at the proper time and in the desired place.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a side elevation showing the invention applied to a hoe of ordinary construction. Fig. 2 is a longitudinal sectional view, enlarged, of the seed planting attachment. Fig. 3 is an end view, showing the upper or filling end. Fig. 4 is an end view, showing the discharge end. Fig. 5 is a transverse sectional view taken on the line 5—5 in Fig. 2. Fig. 6 is a sectional detail view of the trigger member whereby the device is actuated.

Corresponding parts in the several figures are denoted by like characters of reference.

1 designates a receptacle, preferably of cylindrical shape and having at one end thereof a head 2 provided with a filling orifice 3 which may be obstructed by a lid 4 which is revoluble about the axis of a pin 5, whereby it is connected with the head 2, said lid having an opening 6 which may be brought into or out of registry with the filling orifice 3. A stud 7 which projects from the lid 4 through an arcuate slot 8 in the end member 2 serves to limit the movement of the lid in either direction.

A bracket is provided consisting of a bar 9 having at one end thereof a downturned arm 10, said bar being provided near its other end with a downwardly extending clip 11 which is riveted upon or otherwise firmly secured to the casing or receptacle 1. The bar 9 is also provided near the ends thereof with clips 12 adapted to afford seats for the handle 13 of an ordinary hoe, the blade of which appears at 14. The bar 9 is also provided with a handle engaging clasp or clamp 15 which may be equipped with a set screw 16, whereby the bar or bracket and the casing or receptacle carried thereby may be firmly mounted on the hoe handle in proper position for operation.

The receptacle or container 1, which may be advantageously constructed of sheet metal, is provided at its discharge end with an external bead 17, whereby the structure is materially strengthened. The beaded portion is provided with an aperture 18 for the passage of seed from the receptacle or container to a discharge spout 19 which is suitably connected with the receptacle. A sleeve or collar 20 is mounted for oscillation upon the beaded portion of the receptacle, said sleeve being provided with a retaining flange 22 extending within the receptacle and lying closely adjacent to the wall thereof, said flange being provided with several apertures 23 of varying sizes, any one of which by rotating the sleeve or collar about its axis may be placed in registry with the discharge aperture 18, as clearly seen in Fig. 2. The sleeve may be provided with a pin or projection 24 constituting a handle whereby it may be readily manipulated, and said pin may also serve as a tightening member for the purpose of retaining the sleeve in adjusted position, although the frictional engagement of the sleeve with the receptacle will be usually considered sufficient for this purpose. The receptacle is provided with a head 25 which is revoluble about the axis of a pin 26 carried by the arm 10 of the bar or bracket 9. A spring 27, which is coiled about the axis of the pin 26, said spring being terminally connected at one end with the head 25, as shown at 28, while the other end of the spring abuts on the arm 10, as shown at 29, serves to rotate the head 25 in one direction to an extent which may be limited by a stop member, such as a pin 30 which is adapted to abut upon a bracket 40 secured within the receptacle 1, and serving in conjunction with the arm 10 to support the pin 26 about the axis of which the head 25 oscillates. The oscillatory head 25 is also provided with a cut-off member 41 adapted to obstruct the passage of seed through the registering apertures 18, 23. For the purpose of rotating the head 25 against the tension of the spring a flexible element, such as a cord 31, is provided, one end of said cord being connected with a pin or eye bolt 32 that extends forwardly from the head 25, and the other end of said cord being conected with slide 33 having a finger piece 34 and constituting a trigger whereby the device may be actuated, said slide being supported by means of a clasp 35 on the hoe handle.

The seed duct or spout 19 may be provided with a tubular extension 36, the latter being supported by means of a strap or bracket 37 connected with the hoe handle. The discharge end of the extension member 36, which terminates directly in rear of the hoe blade 14, is cut off obliquely, as shown at 38, to reduce the liability of its being choked or obstructed by dirt displaced by the hoe when the latter is actively used.

As will be seen from the foregoing description taken in connection with the drawing, the improved device may be readily attached to the handle of an ordinary hoe. When it has been thus applied, and when the receptacle or container 1 is filled with seed, the hoe may be used for cultivating young plants in the customary manner. Wherever seed is to be planted or replanted, this may be effected by simply pulling the slide or trigger 33, thereby oscillating the head 25 about the axis of the pin 26 against the tension of the spring 27, thus uncovering the aperture 23 which is in registry with the aperture 18, and permitting one or more seeds to pass through said apertures and through the spout 18 and the extension 36 of said spout, the seed or seeds being deposited in the ground where a hole has been previously dug for the reception thereof by means of the hoe. As soon as pressure upon the trigger is released, the spring 27 will restore the head 25 to its initial position with the stop pin 30 engaging the arm 10, thereby obstructing the passage of seed.

The device is simple and inexpensive in construction and may be readily applied to or detached from the handle of any ordinary hoe, the utility of which for ordinary hoeing purposes is not interfered with by the presence of the device.

Having thus described the invention, what is claimed as new, is:—

1. In a seed planter, a cylindrical receptacle, a sleeve mounted thereon for oscillation, said sleeve and receptacle being provided with registering apertures, and an oscillatory head within the sleeve, said head carrying a cut-off whereby the registering apertures are normally obstructed.

2. In a seed planter, a cylindrical receptacle having a discharge aperture in the wall near one end thereof, a sleeve supported for oscillation on the receptacle and having a flange adjacent to the inner face of the wall thereof, said flange being provided with a plurality of apertures, any one of which may be placed in registry with the discharge aperture, a spring actuated oscillatory head having a cut-off normally obstructing the registering apertures, and means for actuating the head against the tension of the spring.

3. In a seed planter, a cylindrical receptacle having a discharge aperture in the wall near one end thereof, a movably supported member having a plurality of apertures, any one of which may be placed in registry with the discharge aperture, an oscillatory spring actuated head having a cut-off normally obstructing the registering apertures, and means for actuating the oscillatory head.

4. In a seed planter, a cylindrical receptacle having an external bead at one end, a sleeve engaging said bead and having a retaining flange, said bead being also provided with a flange extending within the receptacle and lying adjacent to the wall thereof, said wall and flange being provided with normally registering apertures, an oscillatory spring actuated head having a cut-off normally obstructing the registering apertures, and means for actuating the head against the tension of the spring.

5. In a seed planter, a cylindrical receptacle having a discharge aperture in the wall near one end thereof, a seed spout connected with the receptacle and communicating with the discharge aperture, a movably supported member having a plurality of apertures of varying sizes, any one of which may be placed in registry with the discharge aperture, an oscillatory spring actuated head having a cut-off normally obstructing the registering apertures, and means for actuating the oscillatory head against the tension of the spring.

6. In a seed planter, a cylindrical receptacle having a discharge aperture, a discharge spout, a spring actuated oscillatory head carrying a cut-off, means for limiting the motion of the oscillatory head under the influence of its actuating spring, and means for actuating the head against the tension of the spring, said means including a suitably guided flexible element, a pin extending from the head and connected with one end of the flexible element, and a trigger supported for sliding movement and connected with the other end of the flexible element.

7. The combination with a hoe, of a seed planting device comprising a cylindrical receptacle having a discharge aperture, and a seed spout, an oscillatory spring actuated head carrying a cut-off, means for limiting the movement of the head under the influence of the actuating spring, means for supporting the receptacle on the handle of a hoe, said means including a bar having handle engaging members, and means whereby said bar is connected with the receptacle, and means for oscillating the head against the tension of its actuating spring including a pin extending from the head, a slide mounted on the hoe handle, and a suitably guided flexible element connecting the pin with the slide.

8. In a device of the character described, a cylindrical receptacle having at one end a filling opening and provided with a discharge aperture in the wall near the other end thereof, means for obstructing the filling opening, a movably supported member having apertures, any one of which may be placed in registry with the discharge opening to regulate the passage of seed therethrough, a seed spout, a supporting bracket having means whereby it may be secured on a hoe handle, a clip connected with the bracket and with the receptacle, an arm extending downwardly from the bracket, a bracket within the receptacle, a pin supported by said arm and bracket, a head supported for oscillation about the axis of the pin, said head having a cut-off member normally obstructing the registering apertures, a spring whereby the head is oscillated in one direction, means for limiting the oscillation of the head under the impulse of the spring, and means for rocking the head against the tension of the spring, said means including a pin extending from the head, a slide supported on the hoe handle, and a suitably guided flexible element connecting the pin with the slide.

In testimony whereof I affix my signature in presence of two witnesses.

THOMAS H. EVANS.

Witnesses:
JNO. A. HIBBEY,
JOS. A. BOOKER.

---

Copies of this patent may be obtained for five cents each, by addressing the "Commissioner of Patents, Washington, D. C."